(12) United States Patent
Kim et al.

(10) Patent No.: US 10,013,150 B2
(45) Date of Patent: Jul. 3, 2018

(54) METHOD AND APPARATUS FOR PROVIDING A USER INTERFACE FOR PLAYING MULTIMEDIA CONTENTS TO A USER TERMINAL

(71) Applicant: CHUNGDAHM Learning, Inc., Seoul (KR)

(72) Inventors: Mu Jung Kim, Seoul (KR); Jun Su Kim, Seoul (KR)

(73) Assignee: CHUNGDAHM Learning, Inc., Seoul (KR)

( * ) Notice: Subject to any disclaimer, the term of this patent is extended or adjusted under 35 U.S.C. 154(b) by 827 days.

(21) Appl. No.: 14/263,140

(22) Filed: Apr. 28, 2014

(65) Prior Publication Data

US 2015/0074529 A1    Mar. 12, 2015

(30) Foreign Application Priority Data

Sep. 10, 2013    (KR) .................. 10-2013-0108741

(51) Int. Cl.
*G06F 3/048*    (2013.01)
*G06F 3/0484*    (2013.01)
*G06F 3/0488*    (2013.01)

(52) U.S. Cl.
CPC ........ *G06F 3/0484* (2013.01); *G06F 3/04886* (2013.01)

(58) Field of Classification Search
None
See application file for complete search history.

(56) References Cited

U.S. PATENT DOCUMENTS

2008/0074486 A1*    3/2008    Robinson ................. G11B 3/00
                                                                            347/264
2010/0318204 A1*    12/2010    Daisy .................... G06F 3/0488
                                                                            700/94

FOREIGN PATENT DOCUMENTS

KR    1020070050639        5/2007
KR      20110094401 A      8/2011
KR    1020120124173       11/2012
KR    1020130019509        2/2013

OTHER PUBLICATIONS

Cassette Tape UI, Sep. 21, 2012, Schillmania, https://web.archive.org/web/20120921094201/http://www.schillmania.com/projects/soundmanager2/demo/cassette-tape/.*
With Free Tape App for iPad, Focusrite Wants Everyone to Record, Aug. 22, 2013, CDM, http://cdm.link/2013/08/with-free-tape-app-for-ipad-focusrite-wants-everyone-to-record/.*
Breen, Christopher, Macworld: Entertainment Software Podcasting, Touch Podcasts for iPhone and iPad, Jul. 3, 2012, http://www.macworld.com/article/1167539/podcasts_for_iphone_and_ipad.html.
Christopher Breen, "Podcasts for iPhone and iPad", Macworld, Jul. 3. 2012. 1 부.

* cited by examiner

*Primary Examiner* — William C Trapanese
(74) *Attorney, Agent, or Firm* — Maginot, Moore & Beck LLP

(57) ABSTRACT

A method for providing a user interface (UI) for playing a multimedia content in a user terminal may include defining a UI area in at least one portion of a display of the user terminal, visually providing a first wheel disposed at one side of the UI area and a second wheel disposed at another side of the UI area, visually displaying playback state information of a multimedia content file being played, in a space between the first wheel and the second wheel, visually (Continued)

displaying a playback control button of the multimedia content file in the UI area.

21 Claims, 7 Drawing Sheets

METHOD AND APPARATUS FOR PROVIDING A USER INTERFACE FOR PLAYING MULTIMEDIA CONTENTS TO A USER TERMINAL

FIELD

This disclosure relates to an apparatus and method for providing a user interface (UI) for playing a content in a user terminal, and more particularly, to a technology for visually providing two wheels in a UI area and displaying a playing state of a multimedia content file between the two wheels.

BACKGROUND

A technology for providing a user interface (UI) for playing a multimedia content in a user terminal provides an image included in a multimedia content file being played to a center of a UI area, displays a caption below the image, and separately displays a playback control button for controlling playback of the multimedia content file. Since the UI does not distinguishably display a segment, which is a part of the multimedia content file being played, a user is not able to select and play a particular segment out of the multimedia content file.

For example, in a laid-open patent No. 2011-0094401 entitled "Multimedia file playing method and player," a segment which is a part of a multimedia content file being played, for example a sentence in a language learning file, is not distinguishably displayed. Therefore, a user of the multimedia content file may not select and play the particular segment.

Accordingly, a UI that visually provides a segment included in a multimedia content file is needed.

SUMMARY

At least one embodiment of the present invention provides a method, apparatus, and system providing a user interface (UI) for playing a multimedia content in a user terminal.

At least one embodiment of the present invention provides a method, apparatus, and system visually displaying playback state information of a multimedia content file when providing a UI.

At least one embodiment of the present invention provides a method, apparatus, and system controlling playback a multimedia content in units of segment by visually displaying segments included in the multimedia content to a user.

According to at least one embodiment of the present invention, there is provided a method for providing a user interface (UI) for playing a multimedia content in a user terminal, the method including defining a UI area in at least one portion of a display of the user terminal; visually providing a first wheel disposed at one side of the UI area and a second wheel disposed at another side of the UI area; visually displaying playback state information of a multimedia content file being played, in a space between the first wheel and the second wheel; visually displaying a playback control button of the multimedia content file in the UI area.

The visually providing of the first wheel and the second wheel may include visually providing at least one segment included in at least one of the first wheel and the second wheel, and the at least one segment may correspond to the multimedia content file.

The at least one segment may be displayed in visually different forms according to a type of the multimedia content file.

The visually displaying of the playback state information may include visually displaying a caption corresponding to the multimedia content file in the space between the first wheel and the second wheel, such that the caption moves from the second wheel to the first wheel.

The visually displaying of the caption may include visually displaying the caption such that the caption moves from the second wheel to the first wheel based on at least one of time information and section information of the multimedia content file.

The visually displaying of the playback state information may include visually displaying at least one segment corresponding to the multimedia content file being played, in the space between the first wheel and the second wheel, such that the at least one segment moves from the second wheel to the first wheel.

The visually displaying of the at least one segment may include visually displaying the at least one segment based on at least one of time information and section information of the multimedia content file being played, such that the at least one segment moves from the second wheel to the first wheel.

The visually displaying of the playback state information of the multimedia content file may include visually displaying at least one of an amplitude corresponding to the multimedia content file being played and an image included in the multimedia content file being played, in the space between the first wheel and the second wheel.

The visually displaying of at least one of the amplitude and the image may include visually displaying at least one of the amplitude and the image based on at least one of time information and section information of the multimedia content file.

The visually providing of the first wheel and the second wheel may include visually providing the first wheel with a high speed control menu for increasing a playback speed of the multimedia content file; and visually providing the second wheel with a low speed control menu for decreasing the playback speed of the multimedia content file.

The playback control button may be toggled to be visually displayed or hidden according to a user input.

According to at least one embodiment of the present invention, there is provided an apparatus for providing a UI for playing a multimedia content in a user terminal, the apparatus including a memory to record a program to be operated in the user terminal; and a processor to control operation of the user terminal according to the program recorded in the memory, wherein the program includes a playback display to dispose a first wheel and a second wheel in a UI area defined in at least one portion of a display of the user terminal, and to visually display playback state information of a multimedia content file being played in a space between the first wheel and the second wheel; and a playback controller to control playback of the multimedia content file corresponding to a user input with respect to the display.

The playback controller may control playback of the multimedia content file by receiving the user input through a playback control button of the multimedia content file, the playback control button displayed in the UI area.

The playback controller may control playback of the multimedia content file based on at least one of time information and section information of the multimedia content file.

The playback display may visually display a caption corresponding to the multimedia content file in the space between the first wheel and the second wheel, such that the caption moves from the second wheel to the first wheel.

The playback display may visually display at least one segment corresponding to the multimedia content file being played, in the space between the first wheel and the second wheel, such that the at least one segment moves from the second wheel to the first wheel, and the at least one segment may be included in at least one of the first wheel and the second wheel.

The playback display may visually display at least one of an amplitude corresponding to the multimedia content file being played and an image included in the multimedia content file being played, in the space between the first wheel and the second wheel.

The user input may be performed by receiving a touch gesture from a user through a touch pad of the display in the UI area.

According to exemplary embodiments of the present invention, a method, apparatus, and system providing a user interface (UI) for playing a multimedia content in a user terminal may be provided.

In addition, according to additional exemplary embodiments of the present invention, a method, apparatus, and system visually displaying playback state information of a multimedia content file during providing of a UI may be provided.

In addition, according to yet further exemplary embodiments of the present invention, a method, apparatus, and system controlling playback a multimedia content in units of segment by visually displaying segments included in the multimedia content to a user may be provided.

DESCRIPTION

Figure 1:
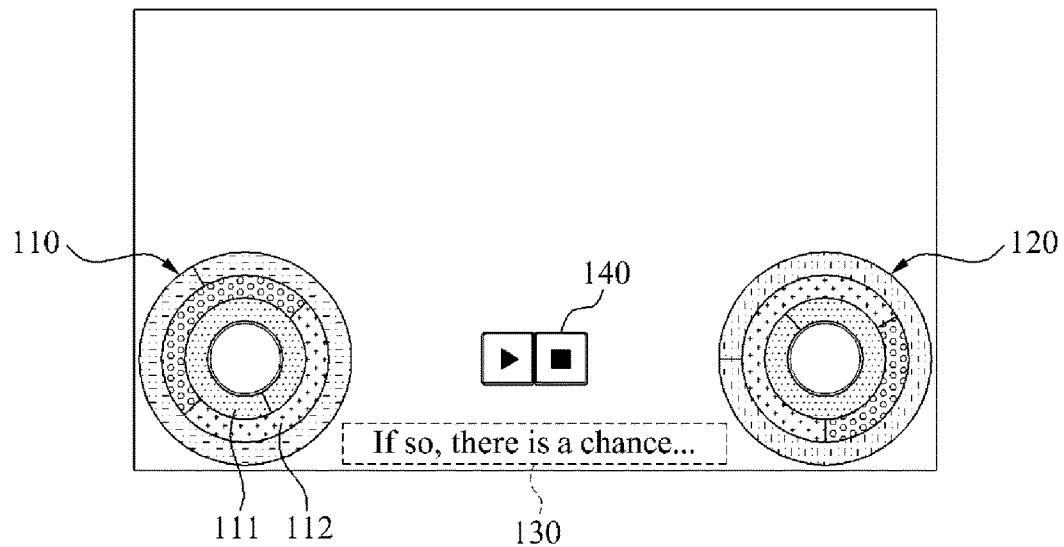
FIG. 1 is a diagram illustrating a user interface (UI) for playing a multimedia content in a user terminal, according to at least one embodiment of the present invention.

Reference will now be made in detail to exemplary embodiments of the present invention, examples of which are illustrated in the accompanying drawings, wherein like reference numerals refer to the like elements throughout. The embodiments are described below in order to explain the exemplary embodiments of the present invention by referring to the figures.

FIG. 1 is a diagram illustrating a user interface (UI) for playing a multimedia content in a user terminal, according to at least one embodiment of the present invention.

Referring to FIG. 1, the UI is defined as at least one portion of a display of the user terminal. The UI may include a first wheel 110, a second wheel 120, playback state information 130 of a multimedia content file being played, and a playback control button 140 for the multimedia content file.

Here, the first wheel 110 may be disposed at one side of a UI area. The second wheel 120 may be disposed at another side of the UI area, different from the one side in which the first wheel 110 is disposed. The first wheel 110 and the second wheel 120 may include at least one segment corresponding to the multimedia content file. The segment may refer to a part of the multimedia content file, which may be displayed in visually different forms according to a type of the multimedia content file. For example, when the multimedia content file is a language learning file, the segment may be a chapter or a sentence included in the language learning file, sectionalized in advance. The segments included in the first wheel 110 and the second wheel 120 may be displayed in visually different forms. For example, a first segment 111 included in the first wheel 110 may be displayed visually differently from a second segment 112. To be more specific, when the multimedia content file includes a first sentence going "Have you answered yes to any of the questions above?" and a second sentence going "If so, there is a chance that you may have a video game addiction" and those sentences are distinguished in advance, the first segment 111 may be a visual expression corresponding to the first sentence of "Have you answered yes to any of the questions above?" and the second segment 112 may be a visual expression corresponding to the second sentence of "If so, there is a chance that you may have a video game addiction." Different color effects may be applied to the first sentence and the second sentence, or the first sentence and the second sentence may be displayed with different numbers. Thus, the UI providing apparatus may control playback the multimedia content file in units of the segments, by displaying the multimedia content file in units of the segment.

The playback state information 130 of the multimedia content file being played may be displayed in a space between the first wheel 110 and the second wheel 120. The playback state information 130 may include a caption, at least one segment, an amplitude, or an image corresponding to the multimedia content file. This will be described in detail later.

The playback control button 140 of the multimedia content file is a menu that supports playback control of the multimedia content file. The playback control button 140 may be toggled to be visually displayed or hidden according to a user input. The user input may be performed by a touch gesture input from the user through a touch pad of a display in the UI area. For example, when the user input is received, the playback control button 140 may be displayed on the UI area. When the user input is not received, the playback control button 140 may be not displayed on the UI area. For example, in detail, an ending menu may be further displayed at a right upper portion of the playback control button 140. Therefore, when the touch input of the user related to the ending menu is received, the playback control button 140 may not be displayed.

Figure 2:
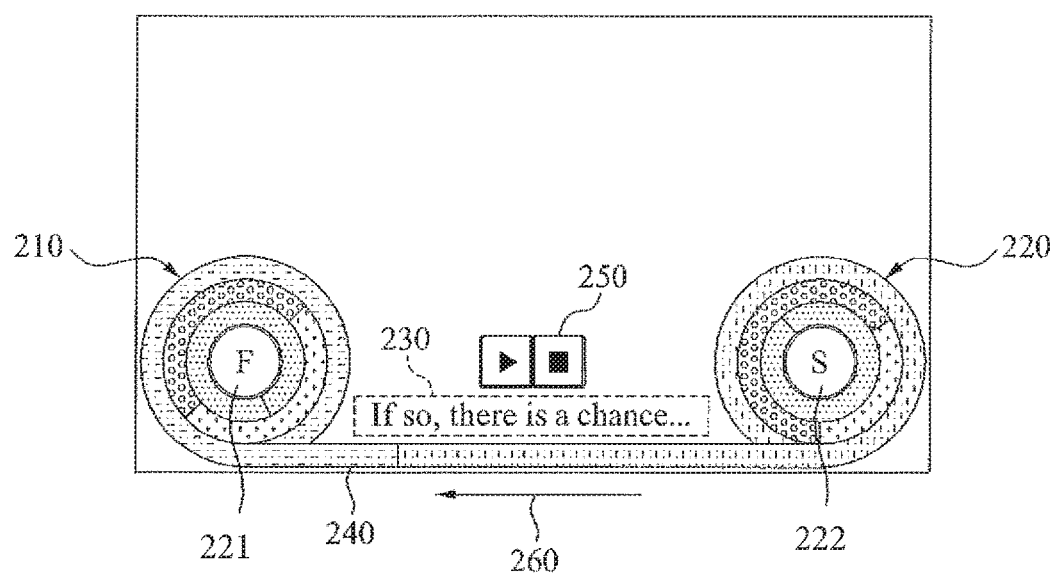
FIG. 2 is a diagram illustrating a UI visually displaying a caption and a segment of a multimedia content file, according to at least one embodiment of the present invention.

FIG. 2 is a diagram illustrating a UI visually displaying a caption and a segment of a multimedia content file, according to at least one embodiment of the present invention.

Referring to FIG. 2, the UI may display playback state information that includes a caption 230 and a segment 240 of the multimedia content file. Here, the caption 230 corresponding to the multimedia content file being played may be visually displayed in a space between a first wheel 210 and a second wheel 220 to be moved 260 from the second wheel 220 to the first wheel 210. The caption 230 may be moved 260 corresponding to a playback speed of the multimedia content file, based on at least one of time information and section information of the multimedia content file. For example, when an audio file of "If so, there is a chance that you may have a video game addiction" included in the multimedia content file is being played, the caption 230 of "If so, there is a chance that you may have a video game addiction" corresponding to the audio file may also be moved 260 from the second wheel 220 to the first wheel 210 based on at least one of the time information and the section information of the multimedia content file.

The segment 240 corresponding to the multimedia content file may be visually displayed in the space between the first wheel 210 and the second wheel 220 to be moved 260 from the second wheel 220 to the first wheel 210. Here, the segment 240 may be moved 260 corresponding to the playback speed of the multimedia content file based on at least one of the time information and the section information of the multimedia content file. For example, when an audio file of "If so, there is a chance that you may have a video game addiction" included in the multimedia content file is being played, the segment 240 corresponding to the audio file may also be moved 260 from the second wheel 220 to the first wheel 210 based on at least one of the time information and the section information of the multimedia content file.

In addition, the first wheel 210 and the second wheel 220 may be provided with a high speed control menu 221 for increasing the playback speed of the multimedia content file being played, and a low speed control menu 222 for decreasing the playback speed of the multimedia content file being played, respectively. For example, the playback speed may be increased in response to a user input with respect to the high speed control menu 221 provided to the first wheel 210, or decreased in response to a user input with respect to the low speed control menu 222 provided to the second wheel 220. Here, the user input may be performed by a touch gesture input from the user through the touch pad of the display in the UI area.

Figure 3:
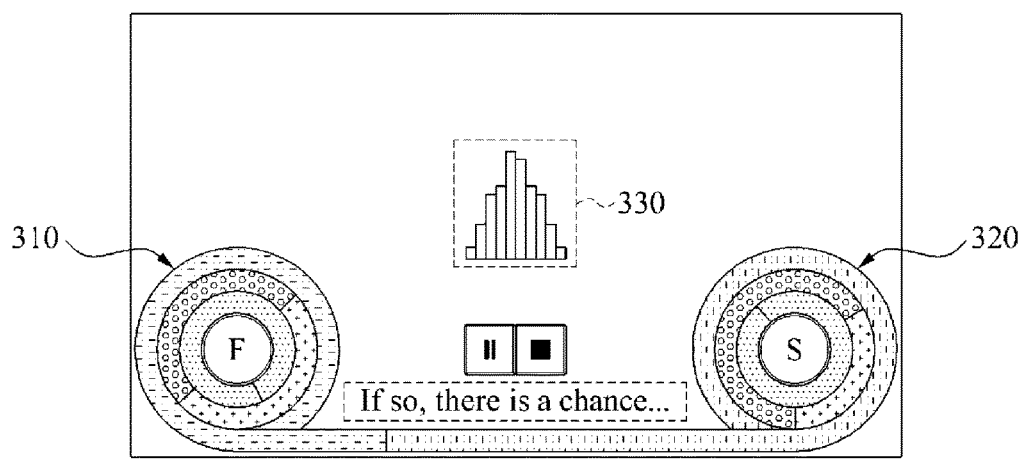
FIG. 3 is a diagram illustrating a UI visually displaying an amplitude of a multimedia content file, according to at least one embodiment of the present invention.

FIG. 3 is a diagram illustrating a UI visually displaying an amplitude 330 of a multimedia content file, according to at least one embodiment of the present invention.

Referring to FIG. 3, the amplitude 330 corresponding to the multimedia content file may be displayed on the UI according to the embodiment. The amplitude 330 may be visually displayed in a space between a first wheel 320 and a second wheel 310 based on at least one of time information and section information of the multimedia content file being played. For example, the amplitude 330 may be visually displayed corresponding to amplitude information of an audio file being played based on at least one of the time information and the section information of the multimedia content file.

Figure 4:
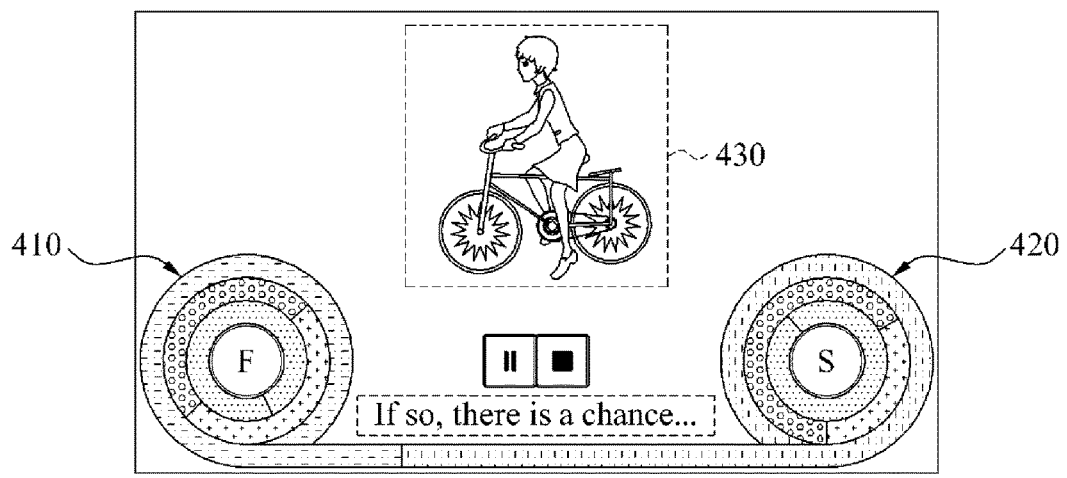
FIG. 4 is a diagram illustrating a UI visually displaying an image of a multimedia content file, according to at least one embodiment of the present invention.

FIG. 4 is a diagram illustrating a UI visually displaying an image of a multimedia content file, according to at least one embodiment of the present invention.

Referring to FIG. 4, the UI according to the embodiment may display an image 430 included in the multimedia content being played. The image 430 may be visually displayed in a space between a first wheel 410 and a second wheel 420 based on at least one of time information and section information of the multimedia content file. The image 430 may be displayed through an entire UI area, rather than the space between the first wheel 410 and the second wheel 420.

Figure 5:
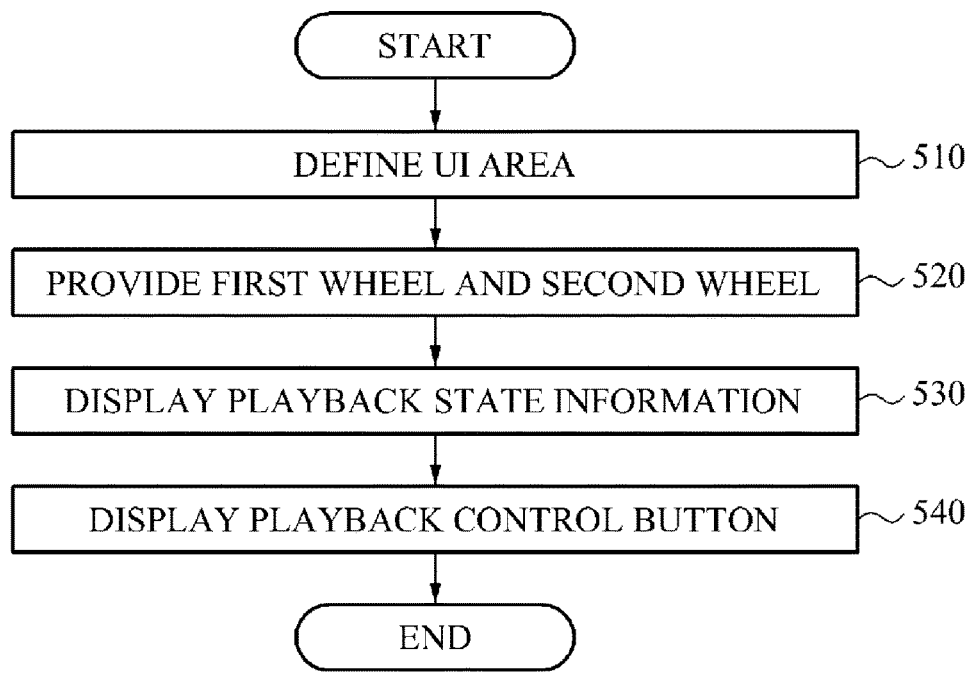
FIG. 5 is a flowchart illustrating a UI providing method according to at least one embodiment of the present invention.

FIG. 5 is a flowchart illustrating a UI providing method according to at least one embodiment of the present invention.

Referring to FIG. 5, in operation 510, a UI providing apparatus according to the embodiment may define a UI area in at least one portion of the display of the user terminal.

In 520, the UI providing apparatus may visually provide a first wheel disposed at one side of the UI area and a second wheel disposed at another side of the UI area. The UI providing apparatus may visually provide at least one segment included in at least one of the first wheel and the second wheel. The at least one segment may correspond to the multimedia content file. In addition, the at least one segment may be displayed in visually different forms according to a type of the multimedia content file. The first wheel may be visually provided with a high speed control menu for increasing a playback speed of the multimedia content file, and the second wheel may be visually provided with a low speed control menu for decreasing a playback speed of the multimedia content file.

In operation 530, the UI providing apparatus may visually display playback state information of the multimedia content being played, in the space between the first wheel and the second wheel. The UI providing apparatus may visually display a caption to be moved from the second wheel to the first wheel, based on at least one of time information and section information of the multimedia content file. In addition, based on at least one of the time information and the section information of the multimedia content file being played, the UI providing apparatus may visually display at least one segment to be moved from the second wheel to the first wheel. In addition, the UI providing apparatus may visually display at least one of an amplitude corresponding to the multimedia content file and an image included in the multimedia content file, based on at least one of the time information and the section information of the multimedia content file.

In operation 540, the UI providing apparatus may visually display a playback control button of the multimedia content file in the UI area. The playback control button may be toggled to be visually displayed or hidden according to the user input.

Figure 6:
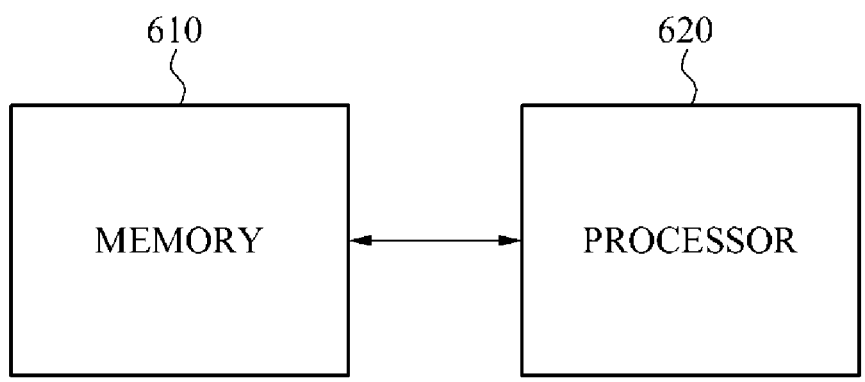
FIG. 6 is a block diagram illustrating a UI providing apparatus according to at least one embodiment of the present invention.

FIG. 6 is a block diagram illustrating a UI providing apparatus according to at least one embodiment of the present invention.

Referring to FIG. 6, the UI providing apparatus may include a memory 610 and a processor 620.

The memory 610 may record a program to be operated in a user terminal. This will be described in detail later.

The processor 620 may control operation of the user terminal according to the recorded program.

Figure 7:
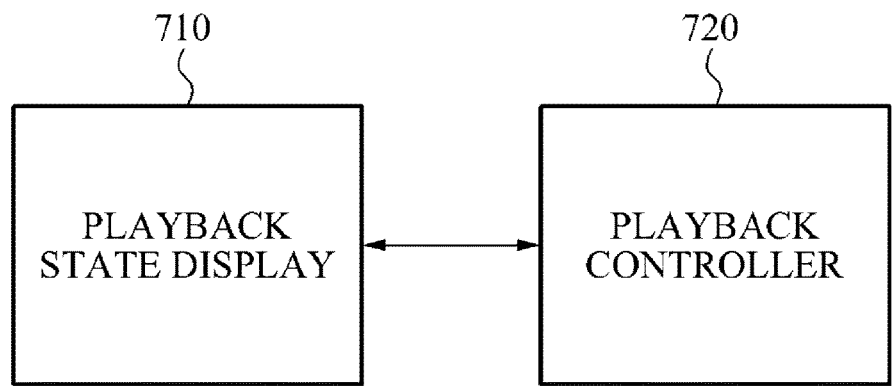
FIG. 7 is a block diagram illustrating a program providing a UI, according to at least one embodiment of the present invention.

FIG. 7 is a block diagram illustrating a program providing a UI, according to at least one embodiment of the present invention.

Referring to FIG. 7, the program providing the UI may include a playback display 710 and a playback controller 720.

The playback display 710 may dispose a first wheel and a second wheel in a UI area defined in at least one portion of a display of a user terminal, and may visually display playback state information of the multimedia content file being played in a space between the first wheel and the second wheel.

The playback display 710 may visually display a caption corresponding to the multimedia content file being played, in the space between the first wheel and the second wheel, such that the caption moves from the second wheel to the first wheel.

Additionally, the playback display 710 may visually display at least one segment corresponding to the multimedia content file being played, in the space between the first wheel and the second wheel, such that the at least one segment moves from the second wheel to the first wheel.

Additionally, the playback display 710 may visually display at least one of an amplitude corresponding to the multimedia content file and an image included in the multimedia content file, in the space between the first wheel and the second wheel.

The playback controller 720 may control playback of the multimedia content file corresponding to a user input with respect to display.

The playback controller 720 may control playback of the multimedia content file, by receiving the user input through a playback control button of the multimedia content file displayed in the UI area.

In addition, the playback controller 720 may control the playback of the multimedia content file, based on at least one of time information and section information of the multimedia content file.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method for providing a user interface (UI) for playing a multimedia content in a user terminal, the method comprising:
    defining a UI area in at least one portion of a display of the user terminal;
    visually providing a first wheel disposed at one side of the UI area and a second wheel disposed at another side of the UI area;
    visually displaying playback state information of a multimedia content file being played, in a space between the first wheel and the second wheel; and
    visually displaying a playback control button of the multimedia content file in the UI area,
    wherein visually providing the first wheel and the second wheel comprises visually providing at least one segment included in at least one of the first wheel and the second wheel, and the at least one segment corresponds to the multimedia content file; and
    wherein the at least one segment includes a plurality of segments displayed in visually different forms according to a type of the multimedia content file.

2. The method of claim 1, wherein visually displaying the playback state information comprises:
    visually displaying a caption corresponding to the multimedia content file in the space between the first wheel and the second wheel, such that the caption moves from the second wheel to the first wheel.

3. The method of claim 2, wherein visually displaying the caption comprises:
    visually displaying the caption such that the caption moves from the second wheel to the first wheel based on at least one of time information and section information of the multimedia content file.

4. The method of claim 3 wherein the at least one segment includes a first segment and a second segment, the first segment displayed visually differently from the second segment according to a type of the multimedia content file, wherein at least one type of the multimedia content file is a language learning file, and wherein the first segment includes at least one of a first chapter or a first sentence included in the language learning file, and wherein the second segment includes at least one of a second chapter or a second sentence included in the language learning file.

5. The method of claim 4 wherein the first segment moves from the second wheel to the first wheel as the caption moves from the second wheel to the first wheel, wherein the type of multimedia content file is unrelated to an audio parameter of the multimedia content file.

6. The method of claim 1, wherein visually displaying the playback state information comprises:
    visually displaying the at least one segment corresponding to the multimedia content file being played, in the space between the first wheel and the second wheel, such that the at least one segment moves from the second wheel to the first wheel.

7. The method of claim 6, wherein visually displaying the at least one segment comprises:
    visually displaying the at least one segment based on at least one of time information and section information of the multimedia content file being played, such that the at least one segment moves from the second wheel to the first wheel.

8. The method of claim 1, wherein visually displaying the playback state information of the multimedia content file comprises:
    visually displaying at least one of an amplitude corresponding to the multimedia content file being played and an image included in the multimedia content file being played, in the space between the first wheel and the second wheel.

9. The method of claim 8, wherein visually displaying at least one of the amplitude and the image comprises:
    visually displaying at least one of the amplitude and the image based on at least one of time information and section information of the multimedia content file.

10. The method of claim 1, wherein visually providing the first wheel and the second wheel comprises:
    visually providing the first wheel with a high speed control menu for increasing a playback speed of the multimedia content file; and
    visually providing the second wheel with a low speed control menu for decreasing the playback speed of the multimedia content file.

11. The method of claim 1, wherein the playback control button is toggled to be visually displayed or hidden according to a user input.

12. The method of claim 1 wherein at least some of the plurality of segments are associated with different multimedia content files, and wherein the type of multimedia content file is unrelated to an audio parameter of the multimedia content file including modulation level, frequency balance, and signal amplitude.

13. An apparatus for providing a user interface (UI) for playing a multimedia content in a user terminal, the apparatus comprising:
    a memory to record a program to be operated in the user terminal; and
    a processor to control operation of the user terminal according to the program recorded in the memory, wherein the program comprises:
        a playback display to dispose a first wheel and a second wheel in a UI area defined in at least one portion of a display of the user terminal, and to visually display playback state information of a multimedia content file being played in a space between the first wheel and the second wheel, the first wheel and the second wheel visually providing at least one segment included in at least one of the first wheel and the second wheel and the at least one segment corresponding to the multimedia content file,
        wherein the at least one segment includes a plurality of segments displayed in visually different forms according to a type of the multimedia content file; and
        a playback controller to control playback of the multimedia content file corresponding to a user input.

14. The apparatus of claim 13, wherein the playback controller controls playback of the multimedia content file by receiving the user input through a playback control button of the multimedia content file, the playback control button displayed in the UI area.

15. The apparatus of claim 13, wherein the playback controller controls playback of the multimedia content file based on at least one of time information and section information of the multimedia content file.

16. The apparatus of claim 13, wherein the playback display visually displays a caption corresponding to the multimedia content file in the space between the first wheel and the second wheel, such that the caption moves from the second wheel to the first wheel.

17. The apparatus of claim 13, wherein the playback display visually displays the at least one segment corresponding to the multimedia content file being played, in the space between the first wheel and the second wheel, such that the at least one segment moves from the second wheel to the first wheel, and
    the at least one segment is included in at least one of the first wheel and the second wheel.

18. The apparatus of claim 13, wherein the playback display visually displays at least one of an amplitude corresponding to the multimedia content file being played and an image included in the multimedia content file being played, in the space between the first wheel and the second wheel.

19. The apparatus of claim 13, wherein the user input is performed by receiving a touch gesture from a user through a touch pad of the display in the UI area.

20. The apparatus of claim 13 wherein the plurality of segments includes a first segment and a second segment, the first segment displayed visually differently from the second segment according to the type of the multimedia content file, wherein the type of multimedia content file is unrelated to an audio parameter of the multimedia content file including modulation level, frequency balance, and signal amplitude.

21. A method for providing a user interface (UI) for playing a multimedia content in a user terminal, the method comprising:
    defining a UI area in at least one portion of a display of the user terminal;
    visually providing a first wheel disposed at one side of the UI area and a second wheel disposed at another side of the UI area;
    visually displaying playback state information of a multimedia content file being played, in a space between the first wheel and the second wheel; and
    visually displaying a playback control button of the multimedia content file in the UI area,
    wherein visually providing the first wheel and the second wheel comprises visually providing a plurality of segments included in at least one of the first wheel and the second wheel, wherein each of the plurality of segments is displayed in visually different forms according to a type of multimedia content file associated with the segment, wherein at least one type of multimedia content file is a language learning file, and wherein at least one of the plurality of segments includes a chapter or a sentence included in the language learning file.

\* \* \* \* \*